United States Patent Office 3,108,964
Patented Oct. 29, 1963

3,108,964
LUBRICATING COMPOSITION
Charles H. Bailey, Berkeley, Calif., assignor to Shell Oil Company, New York, N.Y., a corporation of Delaware
No Drawing. Filed Dec. 23, 1960, Ser. No. 77,814
7 Claims. (Cl. 252—37.2)

This invention relates to improved hydrocarbon lubricants, and particularly to mineral lubricating oil composition which possess good detergency, antiwear, as well as sludge, corrosion or rust inhibiting properties.

It is known that certain non-ash forming polymeric nitrogen-containing compounds in which the nitrogen-containing groups may be amino or amido groups such as vinyl pyridines or vinyl pyrrolidones, function as detergents when added in small amounts to lubricants such as mineral lubricating oils. However, copolymers of this type have been found to lack wear inhibiting properties and are generally ineffective in inhibiting rust and under severe conditions of use such as under extreme temperatures and pressure they have been found to be shear unstable resulting in loss of viscosity and other undesirable side effects. This is particularly evident when such lubricants are used to lubricate engines operating on high sulfur fuels or leaded fuels. Fuels of this type are a contributing source of strong mineral acids in the lube oil, which acids cause wear, rust and corrosion.

In order to overcome these defects, the art discloses that the addition of basic polyvalent metal salts such as basic alkaline earth metal petroleum sulfonates or aromatic carboxylates such as alkyl salicylates, impart wear inhibiting properties to lubricants containing the above-mentioned non-ash forming detergents. However, it has been observed that such basic materials tend to complex with the nitrogen non-ash forming detergent causing undesirable side effects such as sludging and the like.

It has now been discovered that excellent ash-free detergent lubricants are provided having in addition wear, rust and corrosion inhibiting properties as well as being resistant sludging tendencies, by dispersing in lubricating oils such as mineral lubricating oils containing polymeric basic nitrogen-containing detergents, a small amount of a silver salt of a low molecular weight organic carboxylic acid having from 2 to 10 carbon atoms in the molecule.

The detergent basic nitrogen-containing polymers useful in compositions of the present invention include copolymers of monomers having polymerized linkages and containing nitrogen-containing groups which may be amino or amino-amido groups. They may be derived from polymerizable monomers containing primary, secondary or tertiary (the latter two are preferred) amino nitrogen, including heterocyclic amino nitrogen-containing substances, having an ethylenically unsaturated polymerizable group. These detergent polymers may be obtained by polymerizing vinyl substituted heterocyclic nitrogen-containing substances such as vinyl pyridine, vinyl picoline and vinyl quinoline, or vinyl arylamines such as para-aminostyrene, or polyamines prepared by reacting polymeric epoxy compounds with ammonia or primary or secondary amines; with polymerizable unsaturated alcohols, acids or esters such as acrylates and methacrylates of long chain fatty acids, and the like. The preferred polymeric amino compounds are those containing tertiary amine groups and particularly those containing heterocyclic amino groups such as obtained by copolymerizing a polymerizable heterocyclic nitrogen base compound with a polymerizable unsaturated material free of heterocyclic nitrogen-containing radicals such as are described in British patent specification 760,544 and U.S. Patents 2,839,512 and 2,889,282. The copolymers include: copolymer of stearyl methacrylate and 2-methyl-5-vinyl pyridine; copolymer of stearyl methacrylate, lauryl methacrylate and 2-methyl-5-vinyl pyridine; and those which contain additional $C_{1-4}$ alkyl methacrylates in the polymer, such as copolymers of stearyl methacrylate, lauryl methacrylate, methyl methacrylate and 2-methyl-5-vinyl pyridine; and similar copolymers in which the methyl methacrylate is replaced by butyl methacrylate and the 2-methyl-5-vinyl pyridine is replaced by 5-ethyl-2-vinyl pyridine. Other suitable polymeric amines are those available commercially such as those sold by E. I. du Pont de Nemours and Co. under the designations LOA 564 and 565, which are copolymers of lauryl methacrylate and diethylaminoethylmethacrylate (see U.S. Patent 2,737,496).

Particularly preferred detergent polymers are the copolymers of vinyl pyridine and mixtures of dissimilar methacrylate esters, the preparation of which is illustrated by the following examples.

EXAMPLE I

A mixture of 25% of 2-methyl-5-vinyl pyridine and 75% stearyl methacrylate were heated in a 50–50 mixture of benzene and a light mineral oil (East Texas 100 SSU at 100° F. neutral) to about 120° C. at which time 0.25% wt. of ditert.butyl peroxide was added and the reaction mixture was maintained at this temperature for about 6 hours.

At the completion of the reaction, the solvent was stripped off and the polymer diluted with neutral oil to a polymer content of about 30% by weight and filtered at 100–120° C. The copolymer had a molecular weight of about 200,000 and a nitrogen content of 2.94%.

EXAMPLE II

30% stearyl methacrylate, 51% lauryl methacrylate, 14% methyl methacrylate and 5.0% 2-methyl-5-vinyl pyridine were charged to a 300-gallon stainless steel autoclave. A 50–50 mixture of benzene and neutral petroleum oil was then added to the autoclave so as to furnish 1 part of the mixture per 3 parts of the total monomer. 0.25% of ditert.butyl peroxide was then added and the mixture heated at 120° C. for about 7 hours.

At the completion of the reaction, the benzene was stripped off to final conditions of 120° C. and 10 mm. Hg with nitrogen purging. The benzene-free product was then diluted with neutral oil to a polymer content of about 30% by weight and filtered at 100–120° C. The polymer had a molecular weight of about 600,000 and a nitrogen content of 0.54%.

The wear and corrosion inhibitors for the above basic detergents are the silver salts of low molecular weight organic carboxylic acids having from 2 to 10 carbon atoms in the molecule. The acid portion of the silver salt may be aliphatic, cycloaliphatic or aromatic carboxylic acids such as acetic acid, propionic acid, butyric acid, lactic acid; dicarboxylic acids, e.g., succinic acid, maleic acid, glutaric acid, adipic acid; cyclohexanoic acid; benzoic acid, salicylic acid and mixtures thereof. Specific examples of such silver salts include silver acetate, silver propionate, mono and disilver succinate, silver lactate, silver benzoate, silver salicylate and mixtures thereof.

The silver salts used in compositions of the present invention although relatively oil-insoluble, are stably dispersed in the oil by means of the detergent polymers which function as efficient suspending or dispersing agents for the silver salts.

Additional improvement of oil compositions containing the above two additives of the present invention, namely the polymeric nitrogen-containing detergent and silver carboxylate, particularly with respect to oxidation and storage stability is accomplished by addition of small amounts of alkylated bisphenols having the general formula:

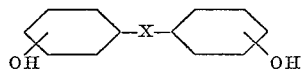

and preferably having the formula:

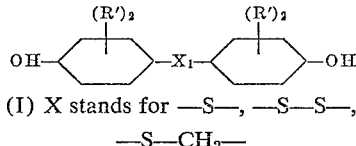

wherein in (I) X stands for —S—, —S—S—, Se,

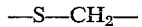

—CH$_2$—S—CH$_2$—, —CHR—, —CR$_2$—, —(CH$_2$)$_n$—, —NH—, —O—, and wherein R stands for methyl or ethyl and n stands for an integer from 1 to 3 and wherein in (II) X$_1$ is CH$_2$ or sulfur and R' is a tertiary alkyl radical. The most preferred alkylated bisphenols are represented by Formula II those having a sulfur bridge or, and most especially, a methylene bridge and where R' is tertiary butyl radical.

The alkylated bisphenols may contain from 1 to 8 alkyl groups, but preferably they contain from 2 to 6 alkyl groups. Alkylated bisphenols having 4 alkyl groups are particularly preferred. Each of the alkyl groups may contain from 1 to 10 carbon atoms, preferably 2 to 6 carbon atoms and especially 4 carbon atoms. Furthermore, the alkyl groups contained by any particular bisphenol may be the same or different and may also be primary, secondary or tertiary alkyl groups. Bisphenols containing at least one tertiary alkyl group are particularly preferred.

The alkylated bisphenols may be prepared by any of the methods known in the art of bisphenol manufacture, for example, by selecting the appropriate alkylated phenols as starting materials and condensing them together by any of the established methods. For example, alkylated bisphenols may be prepared by the method described in U.S. Patent 2,944,086.

As examples of the alkylated bisphenols which may be used according to the invention there are mentioned bis(3-ethyl-4-hydroxyphenyl)disulfide, bis(3 - methyl - 4-propyl - 5 - hydroxyphenyl) - disulfide, bis(2 - isopropyl-3-butyl-5-hydroxyphenyl) selenide, bis 1,2(2,6 - ditertiary butyl-4-hydroxyphenyl)thiaethane, bis 1,2(2,5-diisopropyl-3-hydroxyphenyl)thiaethane, bis(3,5-ditertiary butyl-4-hydroxyphenyl)sulfide, 2,4 - diisobutyl - 3 - hydroxybenzyl-2',4'-dipropyl-3-hydroxybenzyl sulfide, bis 1,2(3-octyl-5-tertiary butyl-4-hydroxyphenyl)ethane, bis 1,1(2,6-diisopropyl - 4 - hydroxyphenyl)ethane, 1,2 - bis(2,4 - ditertiary pentyl-3-hydroxyphenyl)propane, bis(2-tertiary butyl-5-isopentyl-4-hydroxyphenyl)amine, bis(3,5-dibutyl - 4 - hydroxyphenyl)ether, bis(2,6-dipropyl - 4 - hydroxyphenyl)-ether.

Preferred compounds are the alkylated bisphenols having a sulfur or methylene bridge, the former include bis-(2,5-dipentyl-4-hydroxyphenyl)sulfide, bis(2,5-dihexyl-3-hydroxyphenyl)sulfide, bis(2 - methyl - 5 - tertiary butyl-4-hydroxyphenyl)sulfide, bis(2-methyl-5-tertiary butyl-6-hydroxyphenyl)sulfide and particularly bis(3-tertiary butyl-5-methyl-2-hydroxyphenyl)sulfide, and examples of the latter, namely, alkylated bisphenols having a methylene bridge include bis(2,3-ditertiary butyl-4-hydroxyphenyl)-methane, bis(2,5-ditertiary butyl-4-hydroxyphenyl)methane, bis(2,6-ditertiary butyl-4-hydroxyphenyl)methane, bis(3,5-ditertiary octyl-4-hydroxyphenyl)methane, bis(3-tertiary butyl-5-tertiary octyl-4-hydroxyphenyl)methane, and especially bis(3,5-ditertiary butyl-4-hydroxyphenyl)-methane.

Also compositions of the present invention containing the additive combination of the present invention appear to be further improved by the presence of certain phosphorus compounds to give additional unexpected improvement with respect to anti-wear and anti-scuffing.

Thus, this desirable improvement can be imparted to lubricants of this invention by also incorporating a small amount (0.01–2%, preferably 0.1–1%) of a partial or full ester of an organic phosphorus compound. Phosphorus compounds of this type include alkyl, cycloalkyl, alkaryl, aralkyl and aryl phosphites, phosphates, phosphonates, and their thio derivatives, such as C$_{3-18}$ alkyl phosphites, e.g., di and tributyl, octyl, lauryl, stearyl, cyclohexyl, benzyl, cresyl, phenyl phosphite or phosphates, as well as their thio derivatives; P$_2$S$_5$-terpene reaction product, P$_2$S$_5$-pine oil reaction product and metal salts thereof such as Na, K, Ca or Ba salts of P$_2$S$_5$-terpene reaction product; dibutyl methane-phosphonate, dibutyl trichloromethane phosphonate, dibutyl monochloromethane phosphonate, dibutyl chlorobenzene phosphonate, and the like. The esters of pentavalent phosphorus acids such as diphenyl, dicresyl, triphenyl, tricresyl, trilauryl and tristearyl ortho phosphates, P$_2$S$_5$-terpene reaction products and mixtures thereof are preferred.

Minor amounts of each class of additives are sufficient for a highly effective combination. The nitrogen containing copolymer and the silver salt may be used in an amount of about 0.1–10%, preferably about 0.2–5% by weight each of the lubricant, while about 0.05–2%, preferably about 0.1–1% of the methylene bisphenol or sulfide derivative thereof is highly useful and about 0.01–2% of an organic phosphorus compound.

The additive combinations of the present invention may be used to improve various hydrocarbon lubricating oils, whether of natural origin or synthetic, especially oils which are substantially paraffinic and/or naphthenic; they may contain substantial proportions of hydrocarbons having aromatic character but the amounts and types of components should be such that the Dean and Davis (Chem. and Met. Eng., vol 36, 1929, pp. 618–619) viscosity index of the base oil is at least 80, preferably at least 90 to 150.

The oil may be derived from a highly paraffinic crude, in which case distillation and/or dewaxing may be sufficient to provide a suitable base stock; a minimum of chemical or selective solvent treatment may be used if desired. Mixed base crudes and even highly aromatic crudes which contain paraffinic hydrocarbons also provide suitable oil base stocks by well known refining techniques. Usually these comprise the separation of distillate fractions of suitable boiling range followed by selective solvent extraction with solvents such as furfural, phenol and the like to provide raffinate fractions which are suitable for further refining by dewaxing and chemical treatment such as sulfuric acid treatment, etc. Thus, it may be a refined hydrocarbon oil obtained from a paraffinic, naphthenic, asphaltic or mixed base crude, and/or mixtures thereof, such as SAE 5W, 10W, 20W, 20, 30, 40, 50 mineral oils. The hydrocarbon oils may be blends of different mineral oil distillates and bright stock; they may be blended therewith in minor but compatible proportions of fixed oils, such as castor oil, lard oil and the like and/or with synthetic lubricants, such as polymerized olefins, e.g. polyisobutylene.

The following compositions are representative of the invention:

Composition A—
| | Percent |
|---|---|
| Silver acetate | 0.8 |
| Copolymer of Example II | 5.5 |
| Bis(3,5-ditert.butyl-4-hydroxyphenyl)methane | 0.5 |
| Mineral lubricating oil (SAE 30) | Balance |

Composition B—
| | |
|---|---|
| Silver acetate | 1 |
| Copolymer of Example II | 5.5 |
| Bis(3,5-ditert.butyl-4-hydroxyphenyl)methane | 0.5 |
| Tricresyl phosphate | 0.8 |
| Dicresyl phosphate | 0.4 |
| Mineral lubricating oil | Balance |

Composition C—
    Silver acetate _____ 0.8
    Copolymer of Example I _____ 5
    Mineral lubricating oil (SAE 30) _____ Balance
Composition D—
    Silver propionate _____ 0.8
    Copolymer of Example I _____ 5
    Mineral lubricating oil (SAE 30) _____ Balance
Composition E—
    Silver benzoate _____ 0.8
    Copolymer of Example I _____ 5
    Mineral lubricating oil (SAE 30) _____ Balance In order to demonstrate the utility and improved properties of lubricating compositions of this invention, the compositions identified in Table I were engine tested in a CFR engine operated on a commercial fuel containing 3 cc. TEL/gal. as motor mix and 0.16%w sulfur, using a procedure known as the CFR–RD rust test. The CFR–RD rust test is a modified GM–MS test using a CFR engine modified by using aluminum pistons, a cone shaped oil pan and Cadillac hydraulic valve lifters. The test comprises 10 cycles, each consisting of 3 hours running and 3 hours shutdown under the following conditions: speed—1500 r.p.m., load—1.25 H.P., jacket cooling water out temperature—95° F., air/fuel ratio—15/1, spark—30° B.T.D.C., oil temperature in sump—120° F. A mild steel Corrosometer probe is installed within the crankcase space and also in the sump below the oil level. At the completion of test corrosion rates are calculated from the Corrosometer data as described in "Electrical Probes Monitor Corrosion," A. Dravnicks and A. J. Freeman, Petroleum Refiner, July 1958, for these two locations. As a check on the corrosion rates as determined by the Corrosometer method, two ½″ x 2″ x ⅛″ mild steel "weight loss" specimens are installed within the crankcase space on the crankcase door. Corrosion rates are calculated by the "weight loss" method as described in "Corrosion Testing, Evaluation of Metals for Process Equipment," A. Wachter and R. S. Freseder, Chemical Engineering Progress, vol. 43, p. 315, 1947. Also at the completion of test a visual rusting rating is made. The hydraulic valve lifters and plungers, the bottom 4 inches of the push rods and the "weight loss" specimens are all inspected. Each is assigned a rust rating by comparing them with the Emeryville rust rating scale. This scale has 10—perfect, with lesser numbers indicating more rust. The overall rating is the average of ratings of the four parts mentioned above.

Anti-rust additives are tested under the CFR–RD procedure by measuring the corrosion rate and visual rust rating obtained with a base oil, then comparing these data to the corrosion rate and visual rust rating obtained when the base oil includes an anti-rust additive.

The test results were as follows:

Table I

| Composition | Overall Visual Rust Rating, 10—perfect | Corrosion Rate, Mild Steel in Oil Sump, Mils/year |
| --- | --- | --- |
| Composition A | 8.3 | 0.09 |
| Composition B | 8.3 | 0.09 |
| Composition X (mineral oil, SAE 30 +5.5% copolymer of Example II and 0.5% of bis-(3,5-ditert.butyl-4-hydroxyphenyl)methane | 5.4 | 0.92 |

Lubricating compositions of this invention are particularly applicable for high temperature, high speed use as in aviation engines, automotive engines and truck engines, as well as industrial equipment operating under the conditions described in this invention.

I claim as my invention:

1. An improved mineral oil composition consisting essentially of a major amount of mineral oil and from about 0.1% to about 10% of each of a (1) copolymer of a vinyl pyridine and a polymerizable unsaturated material free of heterocyclic nitrogen-containing groups selected from the group consisting of long-chain alkyl acrylate and long-chain alkyl methacrylate and (2) silver salt of an aliphatic monocarboxylic acid having from 2 to 10 carbon atoms.

2. An improved mineral oil composition consisting essentially of a major amount of mineral oil and from about 0.1% to about 10% of each of a (1) copolymer of a vinyl pyridine and a long-chain alkyl methacrylate and a (2) silver salt of an aliphatic monocarboxylic acid having from 2 to 10 carbon atoms.

3. An improved mineral lubricating oil composition consisting essentially of a major amount of mineral lubricating oil and from about 0.1% to about 10% of each of (1) copolymer of 2-methyl-5-vinyl pyridine and a mixture of lauryl and stearyl methacrylate and (2) silver acetate.

4. The mineral oil composition of claim 2 containing from about 0.05% to about 2% of a bisphenol having the formula

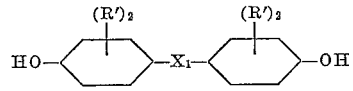

where $X_1$ is a radical selected from the group consisting of —$CH_2$— and S and R′ is a tertiary alkyl radical.

5. The mineral oil composition of claim 3 containing from about 0.05% to about 2% of a bisphenol having the formula

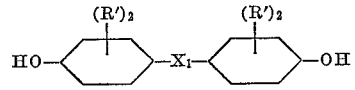

where $X_1$ is a radical selected from the group consisting of —$CH_2$— and S and R′ is a tertiary alkyl radical.

6. An improved mineral lubricating oil composition consisting essentially of a major amount of mineral lubricating oil and from about 0.1% to about 10% each of (1) copolymer of 2-methyl-5-vinyl pyridine and a mixture of lauryl and stearyl methacrylates and (2) silver acetate.

7. The mineral oil composition of claim 6 containing from about 0.1% to about 1% of bis(3,5-ditert.butyl-4-hydroxyphenyl)methane.

References Cited in the file of this patent

UNITED STATES PATENTS

| | | |
| --- | --- | --- |
| 2,807,653 | Filbey et al. | Sept. 24, 1957 |
| 2,846,392 | Morway et al. | Aug. 5, 1958 |
| 2,889,282 | Lorensen et al. | June 2, 1959 |